May 30, 1933.  G. H. FUEHRER  1,911,947
CLEANSING DEVICE FOR ROCK DRILLS
Filed Nov. 17, 1931
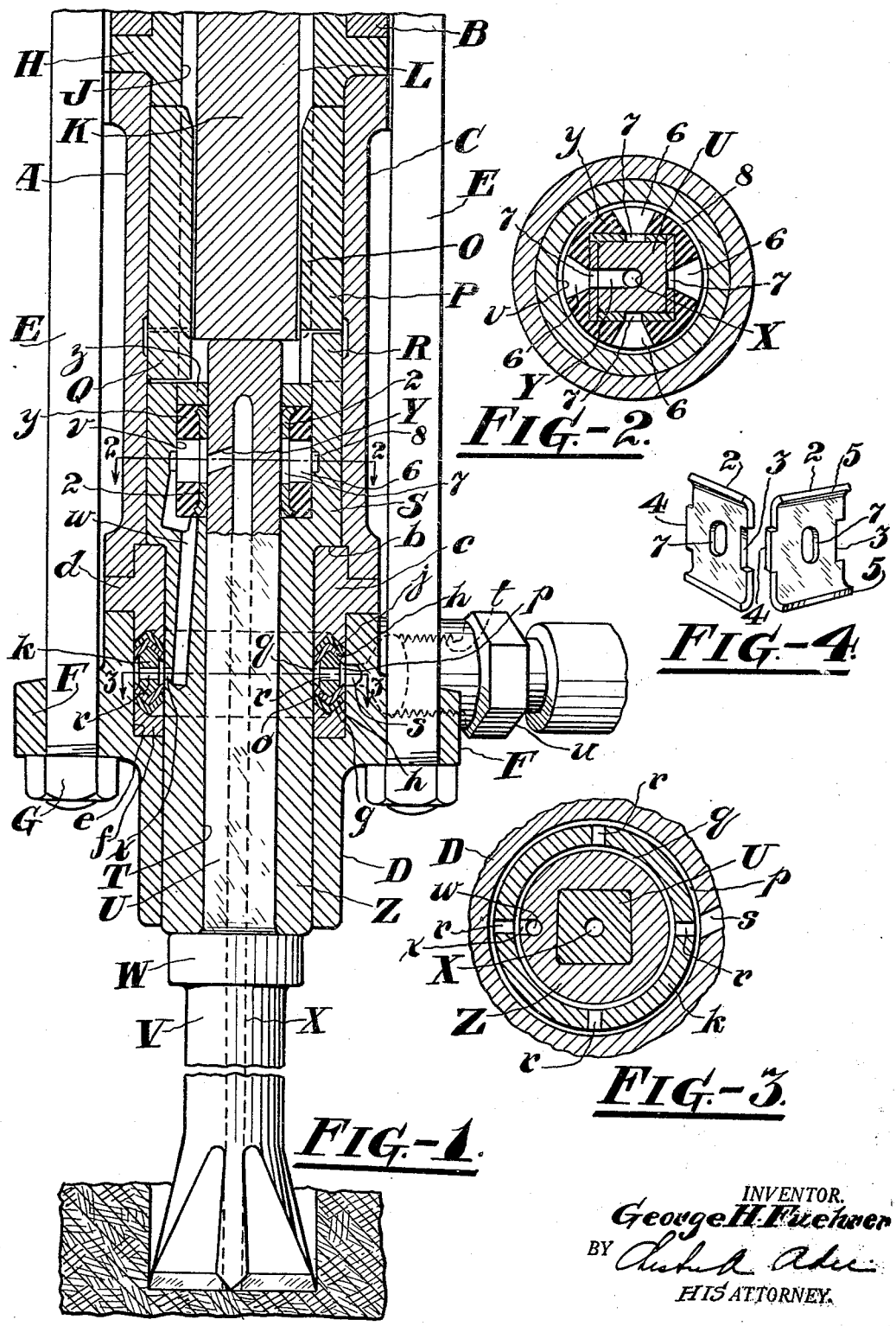
INVENTOR.
George H. Fuehrer
BY
HIS ATTORNEY.

Patented May 30, 1933

1,911,947

UNITED STATES PATENT OFFICE

GEORGE H. FUEHRER, OF EASTON, PENNSYLVANIA, ASSIGNOR TO INGERSOLL-RAND COMPANY, OF JERSEY CITY, NEW JERSEY, A CORPORATION OF NEW JERSEY

CLEANSING DEVICE FOR ROCK DRILLS

Application filed November 17, 1931. Serial No. 575,579.

This invention relates to cleansing devices, but more particularly to a device for supplying cleansing fluid directly to a drill steel through the forward portion of a rock drilling mechanism whereby the drill steel is actuated.

One object of the invention is to assure an adequate supply of cleansing fluid to a drill steel for removing the cuttings from the hole being drilled.

Another object is to prevent the flow of pressure fluid from the rock drilling mechanism to the drill hole.

Still another object is to prevent the leakage of cleansing fluid into the reciprocatory elements of the drilling mechanism.

Other objects will be in part obvious and in part pointed out hereinafter.

In the accompanying drawing forming a part of this specification and in which similar reference characters refer to similar parts, Figure 1 is a sectional elevation of so much of a rock drill as will serve to illustrate the invention and a practical application thereof, Figures 2 and 3 are transverse views taken through Figure 1 on the lines 2—2 and 3—3 respectively and looking in the direction indicated by the arrows, and Figure 4 is a perspective view of a detail.

Referring more particularly to the drawing, the rock drill wherein the invention is embodied is designated in general by A and comprises a cylinder B, only a portion of which is shown, a front cylinder extension C and a front head D which constitute the casing parts of the rock drill and may be suitably clamped together, as for instance by side bolts E. The bolts E extend with their front ends through lugs F on the front head D and are threaded for the reception of nuts G which seat against the lugs F.

Interposed between the cylinder B and the front cylinder extension C and extending partly into both is a front cylinder washer H having a bore J to guide an extension or stem K of a piston reciprocable in the cylinder B in a well known manner.

The stem K is shown as being provided with flutes L to interlockingly engage ribs O in the interior of a chuck part P in the front cylinder extension C. At the front end of the chuck part P is a clutch member or members Q for engagement with a similar member or members R on the rear end of a chuck S lying within the front cylinder extension C and the front head D and having a longitudinal bore T, in this instance of rectangular form, to accommodate a correspondingly shaped shank U of a drill steel V. At the juncture of the shank U and the body portion of the drill steel V is a collar W to abut the front end of the chuck S for limiting the distance which the shank U may extend into the rock drill.

As is customary, the drill steel V is provided with a longitudinally extending passage X for conveying cleansing fluid into the hole being drilled. The passage X terminates with its rear end forwardly of the corresponding end of the shank U and a lateral passage Y is formed in the shank U near the rear end of the passage X to convey cleansing fluid into the said passage X.

The chuck S has a forward extension Z of reduced diameter thus providing a shoulder $b$ to seat upon the rear end of a guide ring $c$ which extends with its rear end into the front end of the front cylinder extension C and with its front end into the front end of the head D. On the outer surface of the guide ring $c$ is a flange $d$ which is clamped between the front head D and the front cylinder extension C to clamp said guide ring in fixed position.

Within an annular recess $e$ in the rear end of the front head D and into which the front end of the guide ring $c$ extends is arranged a second guide ring $f$. The ring $f$ is spaced with respect to the guide ring $c$ and is provided in its rear surface or end with a groove $g$ preferably of V-shape for the accommodation of a packing member or members $h$ which bear with their inner edges against the outer surface of the chuck extension Z and with their outer edges against the wall of the recess $e$.

The guide ring $c$ is also provided with a V-shaped groove $j$ on its front end for the reception of packing members $h$ which, like the packing members in the groove $g$, bear with their inner edges against the outer surface of the chuck extension Z and with their outer edges against the wall of the recess $e$ to prevent leakage of cleansing fluid in a rearwardly direction.

Interposed between the packing members $h$ is a spacer ring $k$ having oppositely inclined surfaces $o$ on its ends to seat against the packing members $h$ for retaining said packing members in the grooves $j$ and $g$ of the rings $c$ and $f$. The spacer ring $k$ is preferably of less thickness than the width of the recess $e$ to provide annular spaces or passages $p$ and $q$ on the outer and inner sides respectively of the spacer ring, and lateral passages or ports $r$ in the spacer ring $k$ afford communication between the passages $p$ and $q$.

Preferably the cleansing fluid for flushing the cuttings from the drill hole is supplied directly to the passage $p$ by a passage $s$ in the front head D and having its outer end threaded as at $t$ for the accommodation of a connection $u$ which may lead from a source of cleansing fluid supply.

In the rear end of the chuck S is a cavity $v$ which communicates with the passage $q$ through a passage $w$ extending forwardly through the chuck S and communicating with the passage $q$ through a port $x$.

In order to effectually seal the cavity $v$ for the purpose of preventing leakage of cleansing fluid therefrom into the percussive element of the drilling mechanism, a packing member $y$, which may consist of rubber, is disposed in the cavity $v$ to surround the shank U of the drill steel adjacent the passage Y. On the rear end of the packing member $y$ is a plate $z$ which is held against rearward movement by the ribs O in the chuck nut P.

In order to protect the packing member $y$ against undue wear such as might be caused by the reciprocatory action of the drill steel V, a series of flat plates 2 are inserted in the packing member $y$ to form a metallic bearing surface for the adjacent portion of the shank U of the drill steel. The plates 2 which may be of a number corresponding to the number of flat surfaces on the shank U of the drill steel, as for instance, four in the case of a rectangular shank, may be of identical formation. Each plate is adapted to seat with an edge against the side of an adjacent plate and with one side against the edge of another adjacent plate. In one edge of each plate is a notch or depression 3 to receive an extension or lug 4 of an adjacent plate, and on the opposite edge of the plate 2 is a lug 4 to fit into a notch 3 of an adjacent plate.

Preferably the ends of the plates are in the form of outwardly curved wings 5 to assure the retention of the plates in the packing and also to enable the rear end of the shank U to be readily entered into the aperture defined by the plates 2.

In order to assure an ample area of communication between the passage $y$ in the drill steel and the passage $w$ in the chuck the packing member and the plates 2 are provided with registering ports 6 and 7 respectively through which cleansing fluid may flow from the passage $w$ into the passage in the drill steel. Preferably an annular passage 8 is formed in the chuck S to encircle the packing member so that an ample supply of cleansing fluid may flow from the passage $w$ to all of the ports 6 and 7.

During the operation of the drill the water flowing from the connection $u$ will pass through the passages $p$, $r$ and $q$ thence through the port $x$ into and through the passage $w$ to the annular passage 8. From there the cleansing fluid will flow through the ports 6 and 7, the passages Y and X into the drill hole to remove the cuttings therefrom. In flowing through the passages $p$ and $q$ the water will act against the exposed surfaces of the packing members $h$ and will press the edges thereof firmly against the adjacent elements of the drill and will thus assist in preventing leakage of cleansing fluid along the peripheral surfaces of the rings $c$ and $f$.

By forming the opening in the packing member $y$ of somewhat smaller size than would be required to permit the drill steel to pass readily therethrough the opening defined by the plates 2, and through which the shank U of the drill steel extends, will also be of somewhat smaller size than the nominal size of the shank U. This is desirable for the reason that by inserting the shank between the plates 2 the plates will be thrust outwardly to a certain extent and, in consequence, the packing member $y$ will be firmly pressed against the wall of the cavity $v$ and also against the plates 2, thus effectually preventing the leakage of water into the drilling mechanism and at the same time preventing the admission of pressure fluid into the drill steel.

I claim:

1. In a rock drill, the combination of a casing and a drill steel extending thereinto and having a passage for cleansing fluid, a chuck in the casing to accommodate the drill steel and having a passage and a cavity, a packing in the cavity having ports to afford communication between the passages, a plurality of guide rings between the casing and the chuck and being spaced with respect to each other, a spacer ring between the guide rings and having channels for supplying cleansing fluid to the passage in the chuck, packing members between the spacer ring and the guide rings to prevent leakage of cleansing fluid along the cooperating surfaces of the guide rings, the chuck and the casing, and means for supplying cleansing fluid to the channels in the spacer ring.

2. In a rock drill, the combination of a casing and a drill steel extending thereinto and having a passage for cleansing fluid, a chuck in the casing to accommodate the drill steel and having a cavity and a passage therein, a plurality of guide rings in the casing to surround the chuck and being located between the cavity and the forward extremity of the casing, a spacer ring between the guide rings and having channels in communication with the passage in the chuck, packing between the spacer ring and the guide rings to prevent leakage of cleansing fluid along the peripheral surfaces of the guide rings, means for supplying cleansing fluid to the channels, and a packing member in the cavity surrounding the drill steel and having a port to afford communication between the passages.

3. In a rock drill, the combination of a casing and a drill steel extending thereinto and having a passage for cleansing fluid, a chuck in the casing to accommodate the drill steel and having a cavity and a passage, a pair of guide rings in the casing to surround the chuck and having grooves in their opposing faces, a spacer ring between the guide rings and having channels in communication with the passage in the chuck, means for supplying cleansing fluid to the channels, packing members seated in the grooves and against the ends of the spacer ring to prevent leakage of fluid along the peripheral surfaces of the guide rings, and a packing member in the cavity having a port to afford communication between the passages.

4. In a rock drill, the combination of a casing and a drill steel extending thereinto and having a passage for cleansing fluid, a chuck in the casing to accommodate the drill steel and having a cavity and a passage, a pair of guide rings in the casing to surround the chuck and having grooves in their opposing faces, a spacer ring between the guide rings and having channels in communication with the passage in the chuck, means for supplying cleansing fluid to the channels, packing members seated in the grooves and against the ends of the spacer ring to prevent leakage of fluid along the peripheral surfaces of the guide rings, a packing member in the cavity to surround the drill steel, a series of interlocking plates in the packing member to provide a bearing surface for the drill steel, and ports in the packing member and the plates to afford communication between the passages.

In testimony whereof I have signed this specification.

GEORGE H. FUEHRER.